(12) United States Patent
Daniel et al.

(10) Patent No.: US 8,144,706 B1
(45) Date of Patent: *Mar. 27, 2012

(54) METHOD AND APPARATUS FOR MANAGING PACKETS IN A PACKET SWITCHED NETWORK

(75) Inventors: Tsahi Daniel, Tel-Aviv (IL); Donald Pannell, Cupertino, CA (US); Nafea Bishara, San Jose, CA (US); Yuval Cohen, Raanana (IL)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/753,808

(22) Filed: Apr. 2, 2010

Related U.S. Application Data (63) Continuation of application No. 10/829,866, filed on Apr. 21, 2004, now Pat. No. 7,706,363.

(60) Provisional application No. 60/478,122, filed on Jun. 11, 2003.

(51) Int. Cl.
*H04L 12/28* (2006.01)

(52) U.S. Cl. ........ 370/389; 370/466; 370/470; 370/474; 370/476; 709/236

(58) Field of Classification Search ............... 370/355, 370/389, 392, 393, 395.1, 397, 395.52, 395.53, 370/409, 465, 466, 470, 474, 476; 709/236, 709/249

See application file for complete search history.

(56) References Cited

U.S. PATENT DOCUMENTS

| | | | |
|---|---|---|---|
| 4,736,363 A | 4/1988 | Aubin et al. | |
| 5,187,591 A | 2/1993 | Guy et al. | |
| 5,621,726 A | 4/1997 | Murakimi | |
| 5,712,604 A | 1/1998 | Tada et al. | |
| 5,946,308 A * | 8/1999 | Dobbins et al. | 370/392 |
| 5,959,990 A | 9/1999 | Frantz et al. | |
| 6,035,105 A | 3/2000 | McCloghrie et al. | |
| 6,049,528 A | 4/2000 | Hendel et al. | |
| 6,111,876 A | 8/2000 | Frantz et al. | |
| 6,151,322 A | 11/2000 | Viswanath | |
| 6,181,699 B1 * | 1/2001 | Crinion et al. | 370/392 |
| 6,192,397 B1 | 2/2001 | Thompson | |
| 6,389,468 B1 | 5/2002 | Muller et al. | |
| 6,414,956 B1 | 7/2002 | Szczepanek | |

(Continued)

FOREIGN PATENT DOCUMENTS

EP 01227623 7/2002

OTHER PUBLICATIONS

IEEE Computer Society, "*IEEE Standards For Local And Metropolitan Area Networks, Secure Data Exchange (SDE)—Security Label(Annexes 2I, 2J, and 2K)*", IEEE Std 802.10g-1995, Supplement to IEEE Std 802.10-1992, 24 pages.

(Continued)

*Primary Examiner* — Jeffrey M Rutkowski (57) ABSTRACT

Systems, methods, and computer program products for modifying standard VLAN tags to perform network packet switching are described. In some implementations, a data packet can be received, and the data format of the data packet can be determined. Then, switching information associated with data package management is generated based on the data format of the data packet. The data packet can be modified using the generated switching information. For example, the modified data packet can be extended by a predetermined length to accommodate additional switching information.

15 Claims, 9 Drawing Sheets

U.S. PATENT DOCUMENTS

| | | | |
|---|---|---|---|
| 6,430,621 | B1 | 8/2002 | Srikanth et al. |
| 6,460,088 | B1 | 10/2002 | Merchant |
| 6,515,993 | B1 | 2/2003 | Williams et al. |
| 6,639,901 | B1 | 10/2003 | Katzri et al. |
| 6,781,998 | B1 | 8/2004 | Karlsson |
| 6,975,627 | B1* | 12/2005 | Parry et al. ............ 370/389 |
| 7,031,325 | B1 | 4/2006 | Williams |
| 7,180,899 | B2* | 2/2007 | De Silva et al. ......... 370/395.53 |
| 7,706,363 | B1* | 4/2010 | Daniel et al. ............ 370/389 |
| 2002/0018489 | A1 | 2/2002 | Ambe et al. |
| 2002/0138628 | A1 | 9/2002 | Tingley et al. |
| 2002/0176450 | A1* | 11/2002 | Kong et al. ............ 370/397 |
| 2003/0091042 | A1 | 5/2003 | Lor |
| 2003/0137982 | A1* | 7/2003 | Sala et al. ............ 370/392 |
| 2003/0172188 | A1* | 9/2003 | Hasegawa et al. ............ 709/249 |
| 2004/0047353 | A1 | 3/2004 | Umayabashi et al. |
| 2008/0240113 | A1 | 10/2008 | Arad et al. |

OTHER PUBLICATIONS

IEEE Computer Society, "*IEEE Standards For Local And Metropolitan Area Networks, Secure Data Exchange (SDE) Sublayer Management (Subclause 2.8) and Recommended Practice for SDE on Ethernet V2.0 in IEEE 802 LANs (Annex 2H)*", IEEE Std 802.10e-1993 and IEEE Std. 802.10f-1993, 40 pages.

IEEE Computer Society,*IEEE Standards For Local And Metropolitan Area Networks, Standard For Interoperable LAN/MAN Security (SILS)* IEEE Std 802.10-1998, Revision of IEEE Std 802-10-1992 (Incorporating IEEE Std 802, 10b-1992, 802, 10e-1993, 802, 10f-1993, 802, 10g-1995 and 802, 10h-1997) 110 pages.

IEEE Computer Society, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications", IEEE Std 802.3—2002, pp. 1-425.

IEEE Computer Society, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications", IEEE Std 802.3—2002, pp. 426-877.

IEEE Computer Society, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications", IEEE Std 802.3—2002, pp. 878-1325.

IEEE Computer Society, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications", IEEE Std 802.3—2002, pp. 1326-1538.

IEEE Computer Society, "Information Technology—Telecommunications and Information Exchange Between Systems—Local and Metropolitan Area Networks—Specific Requirements—Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks", IEEE Std 802.3ac—1998.

IEEE Computer Society, "Information Technology—Telecommunications and Information Exchange Between Systems—Local and Metropolitan Area Networks—Common Specifications—Part 3: Media Access Control (MAC) Bridges: Revision", IEEE P802.1D/D15—1997.

* cited by examiner

METHOD AND APPARATUS FOR MANAGING PACKETS IN A PACKET SWITCHED NETWORK

CROSS-REFERENCE TO RELATED APPLICATIONS

This application is a continuation of application Ser. No. 10/829,866, filed Apr. 21, 2004, now issued as U.S. Pat. No. 7,706,363, which claims the benefit of U.S. Provisional Application No. 60/478,122, filed on Jun. 11, 2003.

BACKGROUND

This disclosure relates to network devices and network communication.

Figure 1:
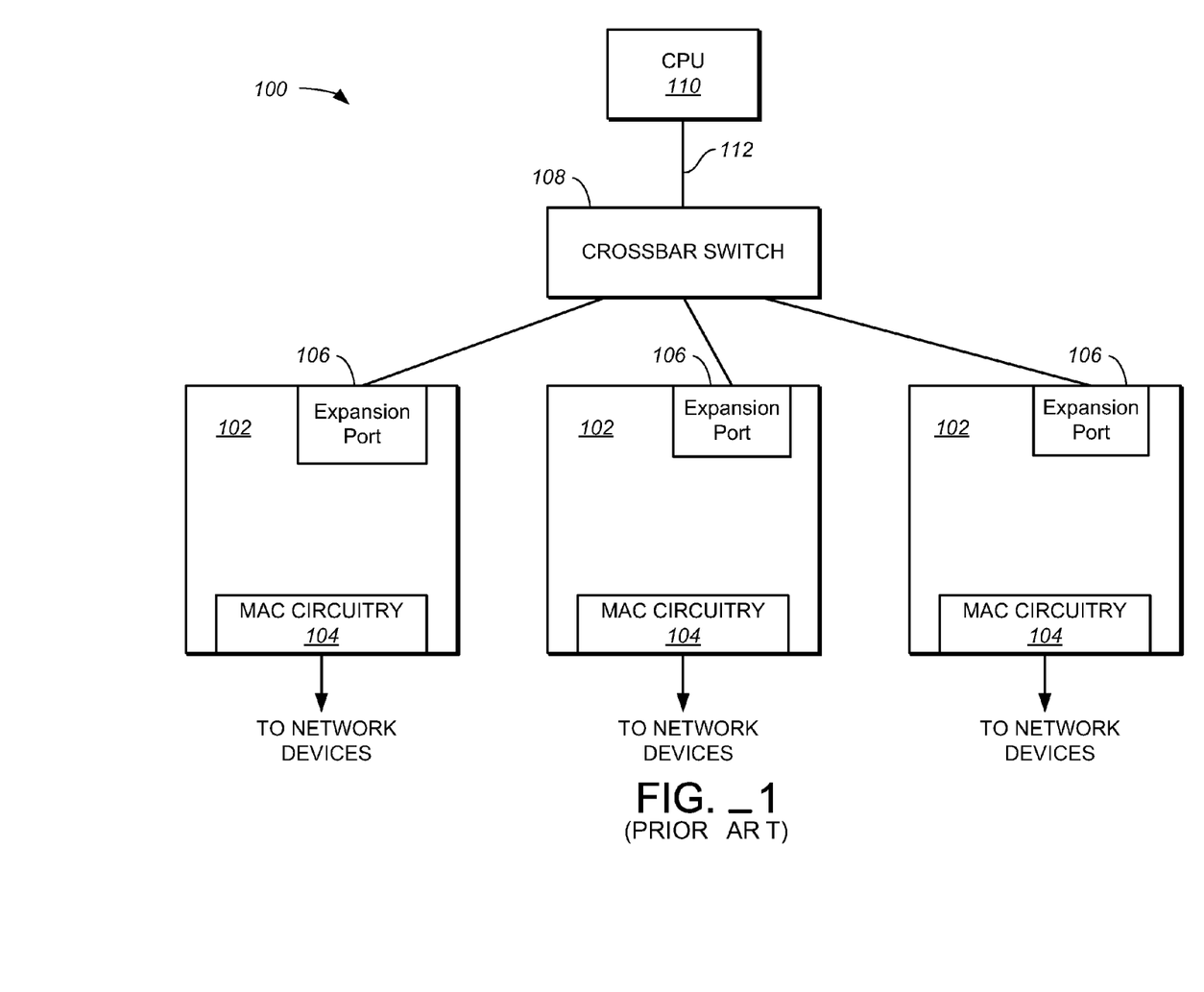
FIG. 1 is a block diagram of a conventional packet switched network.

FIG. 1 shows a conventional packet switched network 100—e.g., an Ethernet (IEEE 802.3) network. Packet switched network 100 includes integrated network switches 102 that permit communication of data packets, between network stations (e.g., personal computers, workstations, servers, or other end user devices) (not shown). Network switches 102 can be gateway devices such as, switches, routers, and the like, having network interfaces for forwarding data packets originating from the network stations. Each network station in packet switched network 100 may be associated with a port among network switches 102. Data packets are generally transferred between the network stations through conventional Ethernet media access controller (MAC) circuitry 104 for each port.

Each network switch 102 typically includes a dedicated expansion port 106 that allows each of network switches 102 to be cascaded together through a separate switch network—for example, a crossbar switch 108. Crossbar switch 108 provides an interface to a central processing unit (CPU) 110 (e.g., through a PCI bus 112) for central-management of data packet flow through network switches 102.

Figure 2A:
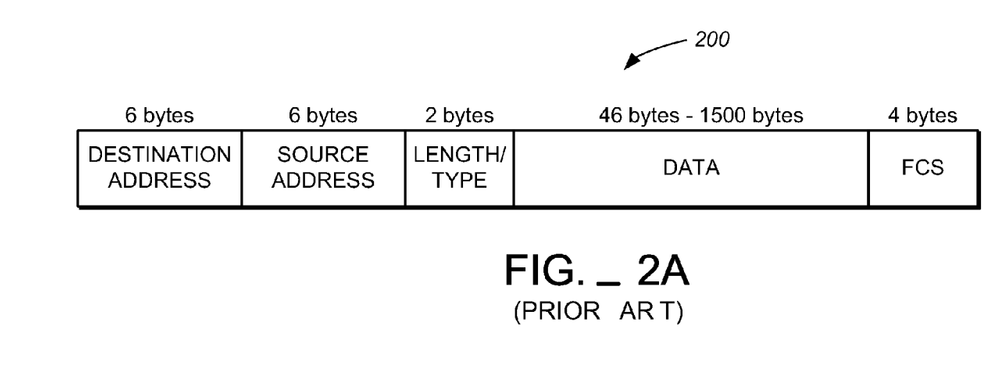
FIGS. 2A and 2B are diagrams of untagged and tagged frame formats, respectively, as provided by the IEEE 802.3ac standard.
Figure 2B:
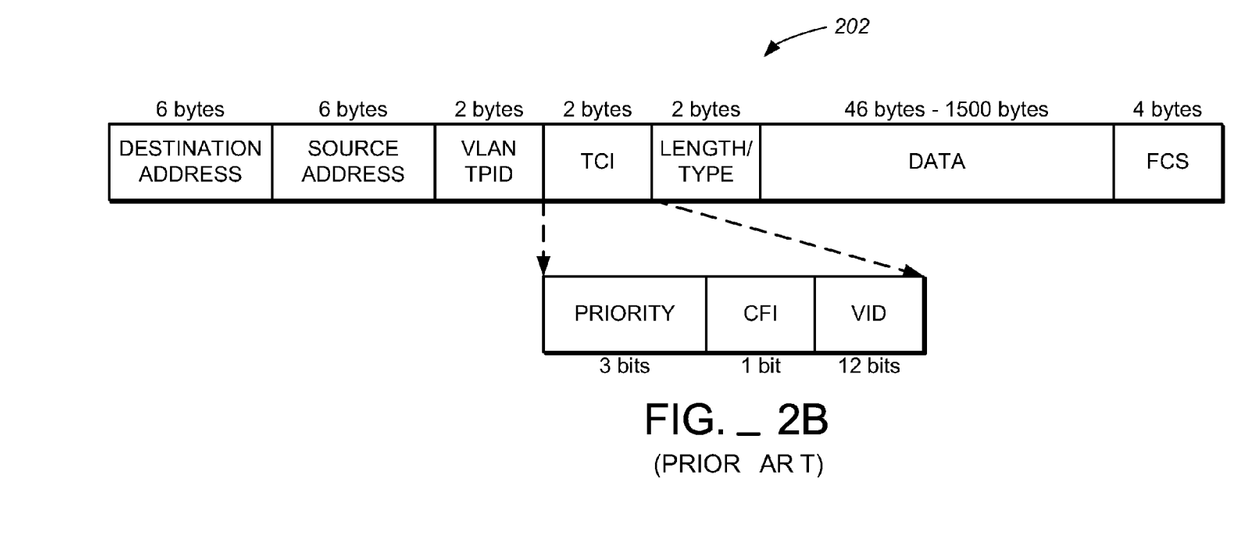

The network stations connected to packet switched network 100 are generally grouped into logical workgroups—i.e., virtual local area networks (VLANs). Data packets communicating within a VLAN group require a VLAN tag that identifies the VLAN group, for example, a VLAN type and VLAN ID. Conventionally, a VLAN tag is included as one or more additional fields within a frame header of a given data packet. For example, the Ethernet IEEE 802.3 standard untagged frame format 200 and IEEE 802.3 standard VLAN tagged frame format 202 are shown in FIGS. 2A and 2B, respectively.

Untagged frame format 200 (FIG. 2A) includes a MAC header portion that allocates 6 bytes for a destination address, 6 bytes for a source address, and 2 bytes for length/type data. The destination address specifies either a single recipient (unicast mode), a group of recipients (multicast mode), or a set of all recipients (broadcast mode). Untagged frame format 200 also includes a data portion that is variable in length within a range between 46 and 1500 bytes. A 4-byte frame check sequence (FCS) follows the data portion. In the Ethernet 802.3 protocol, the maximum length for untagged frames is 1518 bytes. VLAN tagged frame format 202 (FIG. 2B) includes a 2 byte VLAN Tag Protocol Identifier (TPID) field and a 2 byte Tag Control Information (TCI) field positioned between the source address field and the length/type field. The TPID field has a fixed, defined value of 8100 in hexadecimal. The first three bits of the TCI field define user priority, allowing 8 priority levels. The fourth bit of the TCI field is the Canonical Format Indicator (CFI), a single-bit flag that is typically set to zero for Ethernet switches. The TCI field also includes a 12-bit VLAN ID (VID) that identifies a particular VLAN—the VID allows for the identification of 4,096 VLANs. In VLAN tagged frame format 202, a 4-byte frame check sequence (FCS) follows the data portion. The frame format for VLAN tagged frames is thus extended in length with respect to untagged frames. In the Ethernet 802.3 protocol, the maximum length for VLAN tagged frames is 1522 bytes.

Referring to FIG. 1, CPU 110 requires switching information, e.g., to maintain central management of data packet flow through packet switched network 100. The switching information can include, for example, an ingress source port and source network switch of a data packet. For a data packet having a VLAN tagged frame passing through a network switch 102, such switching information is typically appended, or pre-appended, to the VLAN tagged frame within a separate field, thus increasing byte size of the data packet.

SUMMARY

In general, in one aspect, this specification describes a method for forwarding a data packet through a network switch. The method includes receiving a data packet at a port of a network switch, the data packet having a defined data frame, encoding a tag to control management of the data packet through the network switch, and an embedding the tag within the data frame of the data packet.

Particular implementations can include one or more of the following features. The method can further include using the embedded tag within the data frame to control management of the data packet. Management of the data packet can include one or more of routing of the data packet, performing ingress filtering, performing egress filtering, determining a source port of the data packet, determining a source network switch of the data packet, determining a destination port for the data packet, and determining a destination network switch for the data packet. The defined data frame can be a virtual local area network (VLAN) tagged frame having a n fixed fields, where n is an integer greater than or equal to 1. The fixed fields can have values being shared among all VLAN tagged frames being forwarded through the network switch. Encoding a tag can include modifying one or more of the n fixed fields to produce a tag encoded with switching information for management of the data packet through the network switch. One or more of the n fixed fields includes a fixed VLAN Tag Protocol Identifier (TPID) field or a fixed Canonical Format Indicator (CFI) field.

The switching information can differentiate data frame types defined for a given data packet. The data frame types can include one or more of the following data frame types selected from the group of a data frame to be sent to the CPU, a data frame sent from the CPU, a forward data frame, and an extended data frame. The switching information can include one or more of the following: whether the data packet is to be ingress filtered or egress filtered; whether the data packet is to be mirrored to a port of the network switch; whether the data packet entered a network port VLAN tagged or untagged; whether the data packet is to be sent from a network port VLAN tagged or untagged; and whether an access control rule (ACL) is to be applied to the data packet. An ACL can include dropping the data packet or forwarding the data packet.

The network switch can be cascaded to one or more other network switches. The switching information includes a target network switch and a target port through which the data packet will be sent. The switching information can include a source network switch and a source port from which the data packet was received. The method can further include restoring the n fixed fields of the VLAN tagged frame to an original value if the data packet is to be sent from the network switch through a VLAN port. The defined data frame can be an untagged frame. Modifying one or more of the n fixed fields to produce a tag encoded with switching information can maintain, or increase, a size of the defined data frame of the data packet.

In general, in another aspect, this specification describes a method for forwarding a data packet through a network switch. The method includes receiving a data packet at a port of a network switch, the network switch being cascaded to one or more other network switches. If the data packet contains a VLAN tag, then a fixed VLAN TPID field and a fixed CFI field are modified to produce an encoded tag. The encoded tag contains switching information for central management of data packet flow through the network switch and the one or more other network switches. The encoded tag is used to forward the data packet through the network switch and the one or more other network switches.

In general, in another aspect, this specification describes a packet switch network including a first network switch. The first network switch has a first port and a second port. The first network switch is operable to forward a data packet from the first port to the second port using an encoded tag. The encoded tag contains switching information for central management of data packet flow through the first network switch. The encoded tag is embedded within a data frame of given data packet.

Particular implementations can include one or more of the following features. The packet switched network can further include one or more second network switches coupled to the first network switch, in which the encoded tag further contains switching information for central management of data packet flow through the first network switch and the one or more second network switches. The packet switched network can further include a single central processing unit (CPU) coupled to, or embedded within, one of the first network switch and the one or more second network switches. The CPU provides instructions for the central management of data packet flow through the first network switch and the one or more second network switches.

In general, in another aspect, this specification describes a switch tag for being embedded within a data frame of a given data packet to be forwarded within a packet switched network. The switch tag includes a 2-bit command type field indicating a data frame type defined for a given data packet; a 1-bit VLAN tag field indicating whether a given data packet entered a network port of the packet switched network VLAN-tagged; a 5-bit source device field indicating a source network switch from which a given data packet entered the packet switched network; a 5-bit source port field indicating a source network port from which a given data packet entered the packet switched network; a 3-bit code field indicating a reason a given data packet is to be forwarded to a CPU of the packet switched network; a 3-bit user priority field representing a user priority of a given data packet; and a 12-bit VLAN ID (VID) field that identifies a particular VLAN for the data packet.

Particular implementations can include one or more of the following features. The switch tag can further include a 1-bit extend field representing whether the switch tag is extended beyond 32-bits. The 3-bit code field can indicate one or more of data packets that are to be forwarded to the CPU without ingress or egress filtering, control data packets to be forwarded to the CPU, ARP (Address Resolution Protocol) broadcast data packets to be forwarded to the CPU, BDPU (Bridge Protocol Data Unit) data packets to be forwarded to the CPU, and IGMP (Internet Group Management Protocol) data packets to be forwarded to the CPU. The 3-bit user priority field can represent an 802.1p User Priority according to Ethernet IEEE 802.3 standards.

In general, in another aspect, this specification describes a computer program comprising instructions to cause a programmable processor to receive a data packet from a port of a network switch. The network switch is cascaded to one or more other network switches. If the data packet contains a VLAN tag, a VLAN tag being an IEEE 802 Ethernet tag having a fixed VLAN Tag Protocol Identifier (TPID) field and fixed Canonical Format Indicator (CFI) field, then the computer program comprises instructions to modify the fixed VLAN TPID field and the fixed CFI field to produce an encoded tag. The encoded tag contains switching information for central management of data packet flow through the network switch and the one or more other network switches. The computer program further including instructions to use the encoded tag to forward the data packet through the network switch and the one or more other network switches.

In general, in another aspect, this specification describes a computer program comprising instructions to cause a programmable processor to receive a data packet from a port of a network switch. The data packet has a defined data frame. The computer program further comprises instructions to encode a tag to control management of the data packet through the network switch and embed the tag within the data frame of the data packet.

Implementations can include one or more of the following advantages. A packet switched system is provided that includes a plurality of network switches that are cascaded together using conventional Ethernet ports—e.g., ports that can connect to a network station. Data packets passing through the packet switched system include an embedded switch tag. The switch tag is encoded with switching information for management including routing of the data packet through the packet switched system. The data packet including the encoded switch tag can have a maximum size that is equal to the maximum size of a standard VLAN tagged frame. Data bandwidth of data packets flowing through a network switch is, therefore, preserved. Management information can be forwarded to a central CPU from network ports of multiple network switches in a similar manner. In addition, ports that reside among different network switches can be aggregated and regarded as a single port (or trunk port), allowing a higher throughput of data through the trunk port.

The details of one or more implementations are set forth in the accompanying drawings and the description below. Other features and advantages will be apparent from the description and drawings, and from the claims.

DESCRIPTION OF DRAWINGS

FIG. 5 is a block diagram of a network switch.

Like reference symbols in the various drawings indicate like elements.

DETAILED DESCRIPTION

Figure 3:
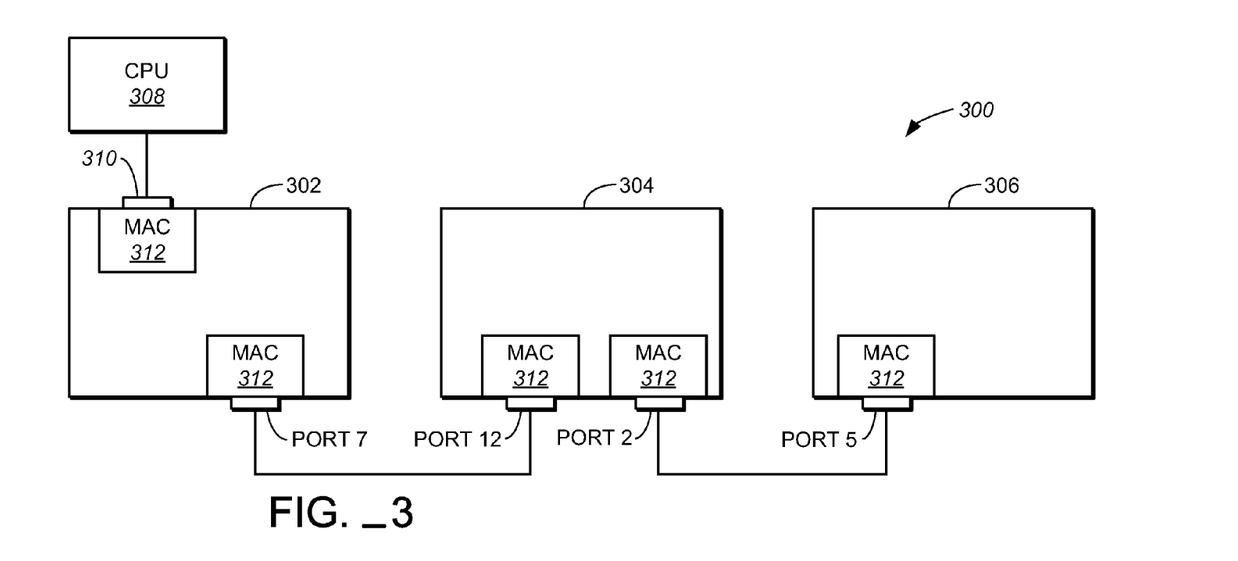
FIG. 3 is block diagram of a packet switched network.

FIG. 3 is a block diagram of a packet switched network 300. In one implementation, packet switched network 300 is an Ethernet (IEEE 802.3) network. In one implementation, packet switched network 300 includes integrated network switches 302-306 that are cascaded together using conventional Ethernet ports. Network switches 302-306 allow communication of data packets between network stations (not shown). Though three network switches 302-306 are illustrated in FIG. 3 by way of example, packet switched network 300 can contain a different number of network switches. Network switches 302-306 can be gateway devices such as, switches, routers, and the like, having network interfaces for forwarding data packets originating from the network stations. In the example of FIG. 3, port 5 of network switch 306 is connected to port 2 of network switch 304, and port 12 of network switch 304 is connected to port 7 of network switch 302.

Packet switched network 300 further includes a CPU 308 that maintains central management of data packet flow through packet switched network 300. Central management of data packet flow includes management tasks such as performing ingress/egress filtering, determining source port(s)/source network switch(es) and destination port(s)/destination network switch(es), routing data packets, and other management-related tasks. Other management-related tasks can include, for example, running a Spanning-Tree protocol. Spanning-Tree protocol is a link management protocol that provides path redundancy while preventing undesirable loops within a network (e.g., packet switched network 300). CPU 308 is connected to a CPU port 310 of network switch 302. CPU port 310 can be a standard Ethernet port that is configured to pass data to and from CPU 308. Conventional Ethernet MAC circuitry 312 can be associated with each of the ports of network switches 302-306.

Figure 4:
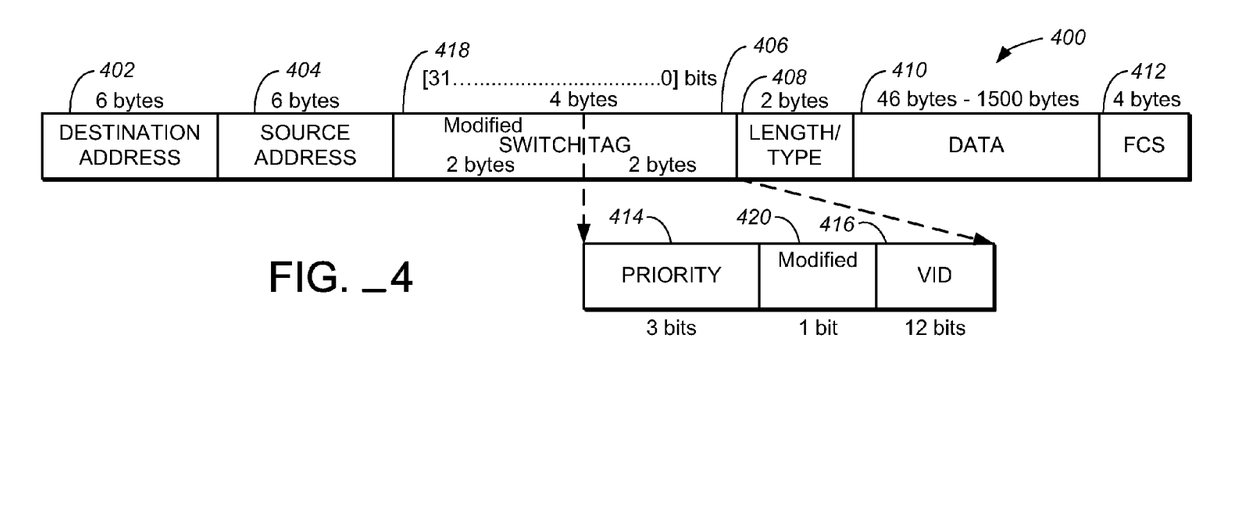
FIG. 4 schematic diagram of a data frame format.

FIG. 4 shows a data frame format 400 of a data packet that flows through network switches 302-306. In one implementation, data frame format 400 includes a MAC header portion that allocates 6 bytes for a destination address 402, 6 bytes for a source address 404, 4 bytes for a switch tag 406 (which is explained in greater detail below), and 2 bytes for length/type data 408. Data frame format 400 also includes a data portion 410 that is variable in length within a range between 46 and 1500 bytes. A 4-byte frame check sequence (FCS) 412 follows data portion 410. In one implementation, a maximum length for data frame format 400 is 1522 bytes.

As discussed above, data frame format 400 contains a 4-byte switch tag 406 positioned between the source address 404 and length/type data 408. In one implementation, switch tag 406 is encoded to contain switching information for central management of data packet flow through network switches 302-306. Unlike a conventional VLAN tagged or untagged frame that may have associated switching information, data frame format 400 includes switch tag 406 positioned (or embedded) within the data packet that is not appended, or pre-appended to the data frame. Switch tag 406 can contain a priority field 414, and a VID field 416.

In one implementation, after a data packet having a conventional VLAN tagged frame enters a port of a network switch 302-306, frame modification logic within the receiving network switch modifies the VLAN TPID field (16 bits) and the CFI bit (1 bit), as discussed in greater detail below. The 17 bits (as modified from a received VLAN tagged frame) can be encoded to contain a variety of information. For example, in one implementation one or more of the 17 bits can be used to differentiate data frame types of data packets flowing through network switches 302-306. As discussed in greater detail below, the data frame types can include a data frame to the CPU, a data frame from the CPU, a data frame to a target sniffer, a forward data frame, an extended data frame, and other frame types and/or functions dependent upon application requirements. A target sniffer is a port to which network test equipment (or network monitor) is attached. The network test equipment monitors network traffic flowing through ports of a network (e.g., packet switched network 300). In one implementation, when an untagged frame enters a port of a network switch 302-306, frame modification logic within the network switch inserts a 4-byte switch tag field between the source address field and the length/type field. In addition, one or more of the 17 bits can be used contain information whether a received data packet was originally VLAN tagged so that this information is not lost. In one implementation, if a given data packet is to sent from a destination port VLAN tagged, frame modification logic within a network switch restores the 17 bits to an original value by setting the VLAN TPID field to contain 8100 (in hexadecimal), and sets the CFI bit to a value of zero. The 17 bits can be restored to other original values depending upon network protocol standards.

FIG. 5 shows one implementation of network switch 302. Network switch 302 includes MACs 312, an ingress control logic circuitry 500, a queue controller 502, and an egress control logic circuitry 504. Network switches 304, 306 can include similar components as network switch 302. Network switch 302 can contain (n) number of ingress control logic blocks and (n) number of egress control logic blocks depending upon a number of ports of network switch 302, where (n) is a positive integer.

MACs 312 can delimit digital data received from a physical layer (phy) (not shown) into data packet frames. In one implementation, each of MACs 312 delimits digital data into data packets having an untagged frame format 200 (FIG. 2A), a VLAN tagged frame format (FIG. 2B), or a data frame format 400 (FIG. 4) having a modified switch tag.

Ingress control logic circuitry 500 can interpret fields within a frame of a data packet. In one implementation, ingress control logic circuitry 500 determines whether a data packet entered network switch 302 untagged, VLAN tagged, or containing an encoded switch tag (e.g., switch tag 406). In one implementation, ingress control logic circuitry 500 determines whether a data packet needs to be replicated, e.g., for mirroring the data packet to a plurality of destination ports.

Queue controller 502 manages an output queue of network switch 302, and directs data packets to selected destination ports within network switch 302. In one implementation, queue controller 502 outputs data packets to a destination port according to a priority level of a given data packet. A multiplexer (not shown) can be used to select among data packets (having different priority levels) for output to a corresponding destination port. In one implementation, queue controller 502 replicates data packets that are to be mirrored to a plurality of destination ports.

Egress control logic circuitry 504 can determine whether a data packet is to egress network switch 302 untagged, VLAN tagged, or tagged with an encoded switch tag (e.g., switch tag 406). In one implementation, egress control logic circuitry 504 includes frame modification logic circuitry 506 that modifies a frame of a data packet based on the following rules. If a data packet enters network switch 302 having an untagged frame format and is to egress network switch 302 having an encoded switch tag (e.g., switch tag 406), then frame modification logic circuitry 506 builds an encoded switch tag (e.g., switch tag 406) for insertion into the untagged frame format. If a data packet enters network switch 302 having a VLAN tagged frame format and is to egress network switch 302 having an encoded switch tag (e.g., switch tag 406), then frame modification logic circuitry 506 modifies one or more fields within the VLAN tagged frame format into an encoded switch tag (e.g., switch tag 406). If a data packet enters network switch 302 having a data frame format including an encoded switch tag (e.g., switch tag 406) and is to egress network switch 302 untagged, then frame modification logic circuitry 506 strips the encoded switch tag (e.g., switch tag 406) from the data frame format. If a data packet enters network switch 302 having a data frame format including an encoded switch tag (e.g., switch tag 406) and is to egress network switch 302 VLAN tagged, then frame modification logic circuitry 506 modifies the encoded switch tag into a VLAN tagged frame format.

Figure 6:
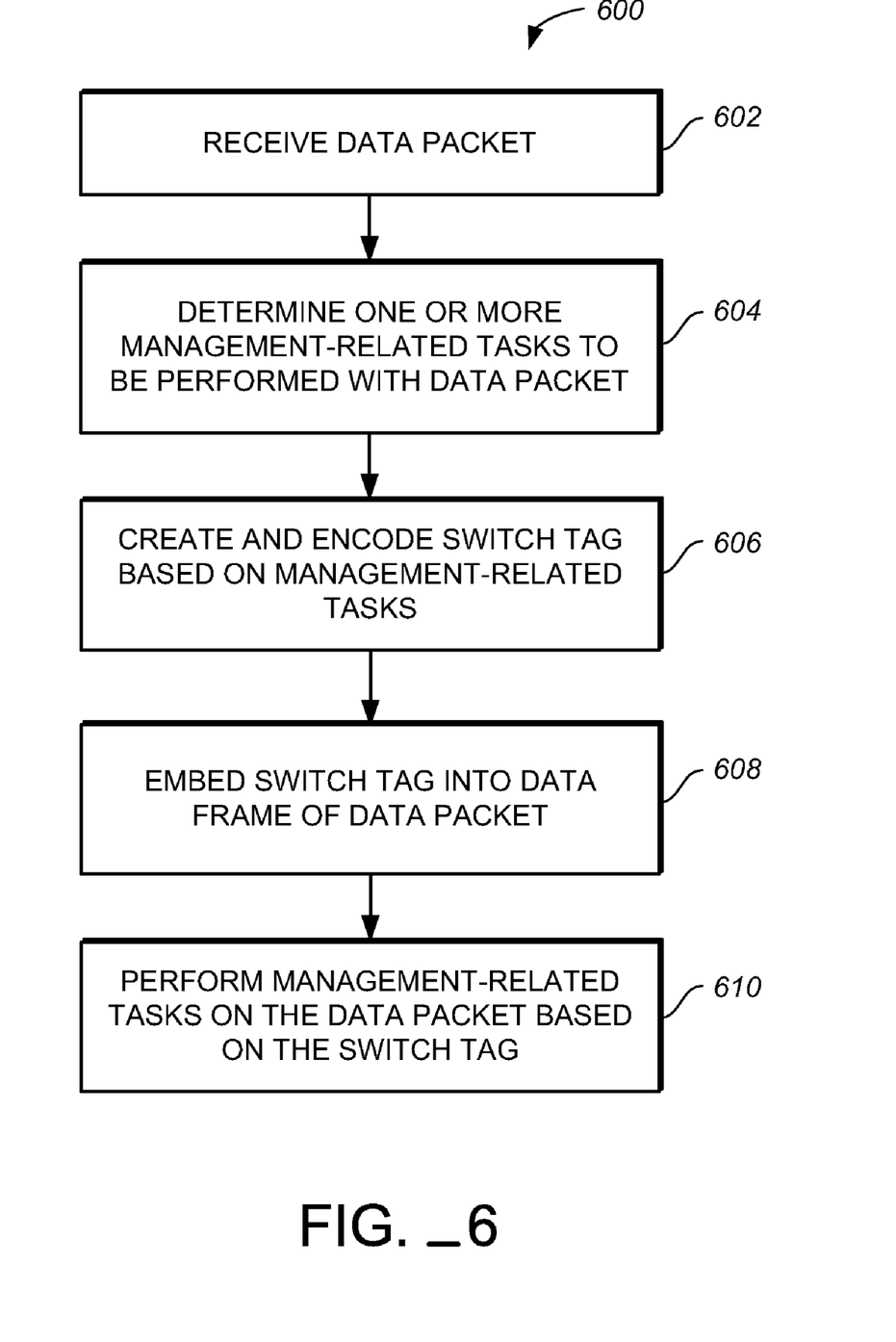
FIG. 6 is a process for managing a data packet.

FIG. 6 shows a process 600 for managing a data packet in a packet switched system (e.g., packet switched network 300). A packet switched system receives a data frame at a port of a network switch (step 602). In one implementation, the packet switched system can receive a data packet that is VLAN tagged or untagged. One or more management-related tasks to be performed with the data packet are determined (i.e., switching information) (step 604). As discussed above, management-related tasks can include tasks such as performing ingress/egress filtering, determining source port(s)/source network switch(es) and destination port(s)/destination network switch(es), routing data packets, and other management-related tasks.

A switch tag is created and encoded based on the management-related tasks to be performed to the data packet (step 606). In one implementation, the switch tag is encoded with switching information by setting bits of the switch tag to pre-determined values having a defined meaning. For example, a single bit within the switch tag can be encoded (or set) to a value of zero to define that the data packet was received at a network port untagged. The switch tag is embedded within the data frame of the data packet (step 608). In one implementation, frame modification logic circuitry (within a network switch) embeds a switch tag within a data frame of a given data packet, as discussed above. Management-related tasks are then performed on the data packet within the packet switched system based on the embedded switch tag (step 610). In one implementation, the packet switched system operates in a switch mode in which all data packets (having an embedded switch tag) are not required to have a header within a data frame identifying the data packets as containing an embedded switch tag.

Figure 7:
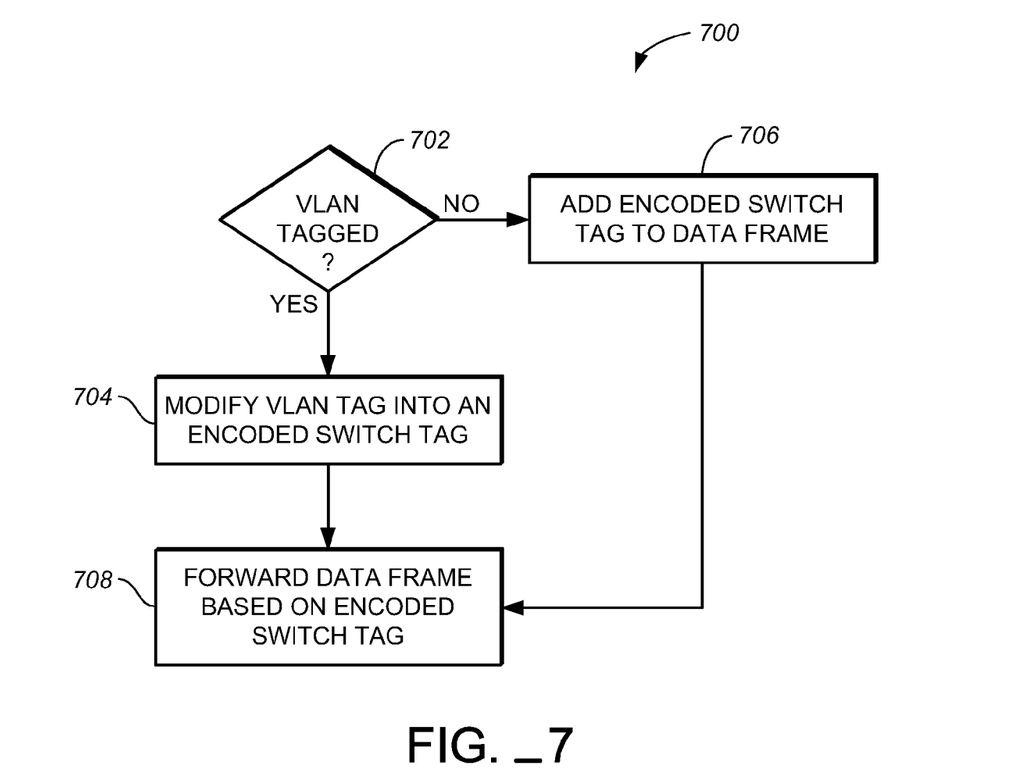
FIG. 7 is a process for embedding an encoded switch tag into a data frame of a data packet.

FIG. 7 shows a process 700 for embedding an encoded switch tag into a data frame of a data packet. In one implementation, the packet switched system receives a data packet at a port of a network switch having a VLAN tagged frame or an untagged frame. A determination is made whether the data frame of the data packet is a VLAN tagged frame or an untagged frame (step 702). In one implementation, ingress control logic circuitry of a network switch determines whether a data packet contains a VLAN tagged frame or an untagged frame. If the data frame is a VLAN tagged frame, the packet switched system modifies the VLAN tag of the data frame to produce an encoded switch tag field (step 704). In one implementation, the packet switched system modifies the VLAN TPID field 418 (FIG. 4) and the CFI bit 420 (FIG. 4). In one implementation, the size of the data frame remains unchanged after the VLAN tag is modified. As discussed above, in one implementation, if the data packet is to be sent from the packet switched system having a VLAN tagged frame, then the VLAN TPID field 418 and the CFI bit 420 can be restored to a value of 8100 (in hexadecimal) and zero, respectively, by the destination port(s). More generally, a number of fixed bits in a given data packet (e.g., the VLAN TPID field 418 and the CFI bit 420) can be restored to other original values depending upon network protocol standards. If the data frame is an untagged frame, the packet switched system adds an encoded switch tag field to the data frame (step 706). From steps 704, 706 the packet switched system forwards the data frame within the network switch based on the encoded switch tag field (step 708).

Implementations of Encoded Switch Tags

Implementations of encoded switch tags will now be described. Particular formats—i.e., bit locations—of fields within the encoded switch tags (described below) are not as important as the types of fields (or tasks) that are encoded within the switch tags.

Data Frame to the CPU

Referring to FIGS. 3 and 4, switch tag 406 can contain one or more bits used to indicate a data packet that is to be forwarded to CPU 308. In the implementation shown in FIG. 3, from the point of view of network switch 306, CPU 308 resides on port 5 (i.e., on the port that connects network switch 306 to network switch 304). Thus, a data packet (that is to be forwarded to CPU 308) received by network switch 306 is forwarded to port 5. Network switch 304 receives the data packet at port 2, and forwards the data packet to port 12. Network switch 302 receives the data packet at port 7 and forwards the data packet to CPU port 310.

In one implementation, switch tag 406 of a data packet to be forwarded to CPU 308 is encoded as shown in Table 1 below.

TABLE 1

| Bits | Name | Description |
| --- | --- | --- |
| 31:30 | Tag_Command | 0—TO_CPU—data packet to CPU—may be egress filtered |
| 29 | Src_Tagged | 0—data packet was received from a network port untagged |
| | | 1—data packet was received from a network port tagged |
| 28:24 | Src Dev | The Source Device (network switch) from which the data packet was received |
| 23:19 | Src_Port | The Source Port from which the data packet was received |
| 18:16 | CPU_Code[3:1] | Upper 3 bits of CPU code CPU_Code[0] is set to Switch_Tag[12] |
| | CPU_Code[0] Switch_Tag[12] | The reason for forwarding the data packet to the CPU |
| 15:13 | UP | 802.1p User Priority field |
| 12 | CPU_Code[0] | LSB of the CPU code |
| 11:0 | VID | The vid of the data packet |

In a data packet to be forwarded to a CPU, the Tag Command (e.g., bits 30:31 switch tag 406) is set to a pre-determined value of zero, having a defined meaning of TO_CPU. The data packet is thus to be forwarded to a port from which the CPU can be reached (or to the CPU port). The forwarding of the data packet can be without egress filtering. The Src_Tagged bit indicates whether the data frame was initially VLAN tagged or untagged when the data frame was received at a network port. The Src Dev field and the Src_Port field indicate an origin of a data packet—i.e., the source device (source network switch) and the source port, respectively. The Src Dev field and the Src_Port field are each 5 bits, allowing for the identification of 32 source devices and 32 source ports.

The CPU Code field represents the reason that the data frame is to be sent to the CPU. For example, in one implementation, the CPU code field is set to a value of (0) for data packets that are sent to the MAC circuitry associated with the CPU port.

The CPU Code field can contain values that represent trapping codes—i.e., data packets that are forwarded to the CPU without ingress or egress filtering. In one implementation, control packets sent to the CPU have a CPU Code field set to a value of (1), and BDPU (Bridge Protocol Data Unit) packets sent to the CPU have a CPU Code field set to a value of (2). A pre-determined MAC address that is contained within a table can be trapped (or forwarded) to the CPU without ingress or egress filtering, such data packets have a CPU Code field set to a value of (3). A pre-determined range of configured MAC addresses can be trapped to the CPU without ingress or egress filtering, such data packets have a CPU Code field set to a value of (4).

The CPU Code field can also contain values that represent intervention codes—i.e., data packets that are forwarded to the CPU and can be ingress and/or egress filtered. An ARP (Address Resolution Protocol) broadcast data packet can be trapped to the CPU. In one implementation, an ARP broadcast data packet has a CPU Code field set to a value of (5). An IGMP (Internet Group Management Protocol) data packet can be trapped to the CPU. In one implementation, an IGMP data packet has a CPU Code field set to a value of (6). A pre-determined MAC address that is contained within a table can be trapped (or forwarded) to the CPU and be ingress and/or egress filtered, such data packets can have a CPU Code field set to a value of (7). A data packet that is received having a new source address can have a CPU code field set to a value of (8).

The CPU Code field can further have values that represent mirroring codes—i.e., data packets that are forwarded to the CPU and a designated destination. Such data packets are not ingress or egress filtered. A pre-determined range of configured MAC addresses can be mirrored to the CPU without ingress or egress filtering, such data packets can have a CPU Code field set to a value of (9). A data packet that is received having a new source address can have a CPU Code field set to a value of (10). A data packet containing an extended switch tag field (discussed in greater detail below) can have a CPU Code field set to a value of (15).

The UP (User Priority) field represents the priority field of the data packet. If the data packet was originally VLAN tagged, the UP field remains unchanged, otherwise, in one implementation, the UP field is assigned to the data packet according to the data packet's Ingress port to a network switch. The VID field is the VLAN ID field of the data packet. If the data packet was originally VLAN tagged, the VID field remains unchanged, otherwise, in one implementation, the VID field is assigned to the data packet according to the data packet's Ingress port to a network switch.

Data Frame from the CPU

Figure 8:
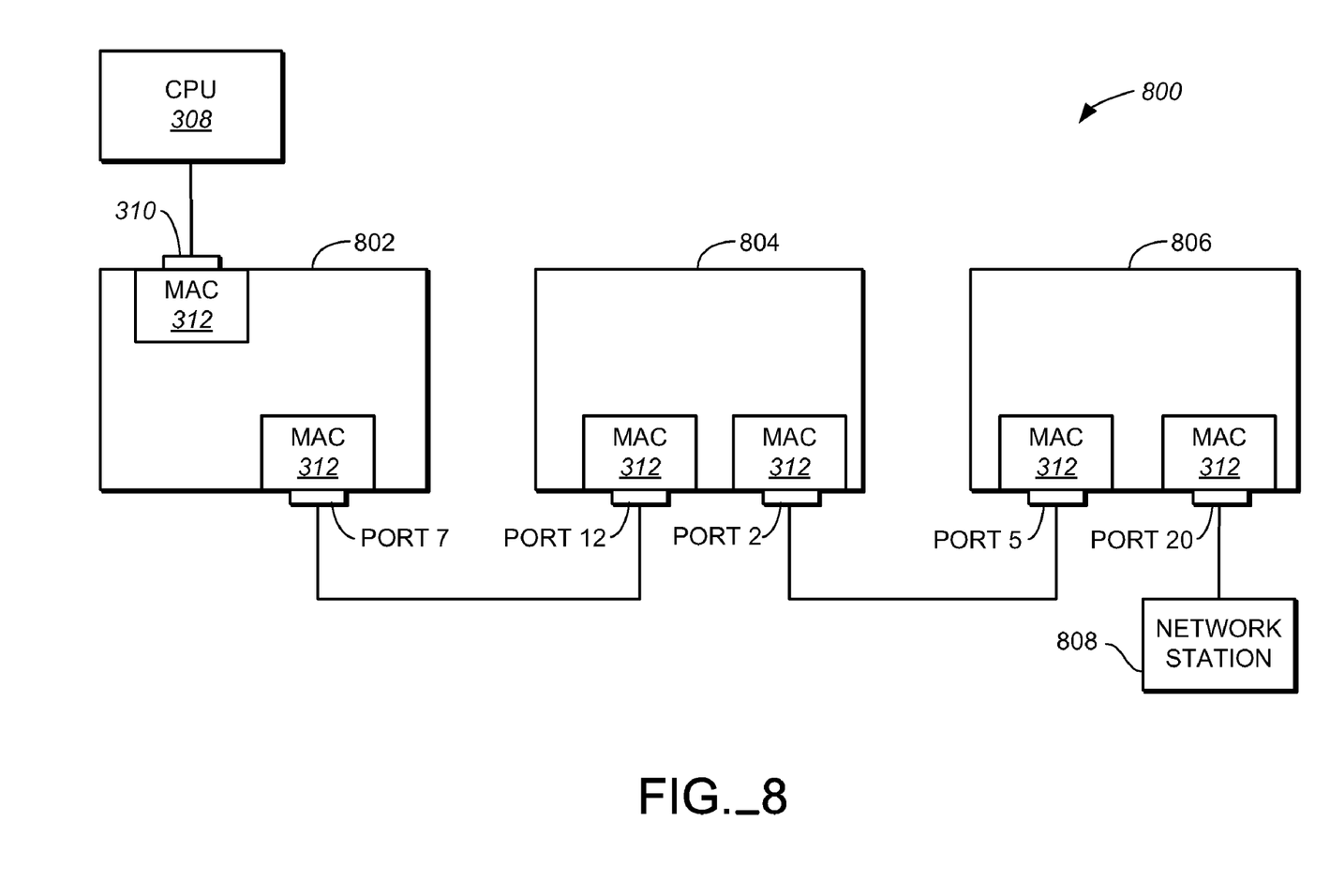
FIG. 8 is block diagram of a packet switched network.

FIG. 8 shows example of a packet switched network 800. Packet switched network 800 includes network switches 802-806. In the example of FIG. 8, CPU 308 is connected to a CPU port 310 of network switch 802. Port 7 of network switch 802 is connected to port 12 of network switch 804, and port 2 of network switch 804 is connected to port 5 of network switch 806. Port 20 of network switch 806 is connected to a network station 808.

In one implementation, CPU 308 sends a data packet to port 20 of network switch 806 by setting a target device field within switch tag 406 to indicate network switch 806, and a target port field to indicate port 20. Network switch 802 can forward the data packet from CPU port 310 to port 7 according to a target device-to-cascading port mapping. Network switch 804 can forward the data packet from port 12 to port 2 according to a target device-to-cascading port mapping. Network switch 806 can forward the data packet from port 5 to port 20. In one implementation, the egress port (e.g., port 20 of network switch 806) is a VLAN port that restores VLAN TPID field and CFI bit the data frame within switch tag 406. Alternatively, if the egress port is not a VLAN port, switch tag 406 is removed from the data frame, and the data frame is sent to a network station untagged.

Referring to FIGS. 4 and 8, switch tag 406 can contain one or more bits used to indicate a data packet that is to be sent from CPU 308. In one implementation, switch tag 406 of a data packet to be sent from CPU 308 is encoded as shown in Table 2 below.

TABLE 2

| Bits | Name | Description |
|---|---|---|
| 31:30 | Tag_Command | 1—FROM_CPU—data packet from CPU—no egress filtering |
| 29 | Dst_Tagged | 0—data packet is to be sent from a network port untagged<br>1—data packet is to be sent from a network port tagged |
| Bits 28:19 | | when use_vidx = 1, use_vidx is Switch Tag[18] |
| 28:20 | MC_Group_Index | The Multicast Group Index, according to which the data packet is to be forwarded<br>When MC_Group_Index is 0x1FF, the data packet is forwarded to all the ports that are members of the VLAN, else MC_Group_Index is a direct pointer to the Multicast Groups Table in the network switch |
| 19 | Reserved | Set to zero |
| Bits 28:19 | | when use_vidx = 0, use_vidx is Switch Tag[18] |
| 28:24 | Trg Dev | The Target Device (network switch) to which the data packet is to be forwarded |
| 23:19 | Trg Port | The Target port to which the data packet is to be forwarded |
| 18 | use_vidx | 0—data packet from the CPU is a unicast packet that is to be forwarded to a specific target specified in Tag<br>1—data packet from the CPU is a multicast packet to be forwarded to the VLAN specified in the Tag VID Field and the Multicast Group specified in the MC_Group_Index field |
| 17:16 | Prio | The Priority of the packet |
| 15:13 | UP | 802.1p User Priority field |
| 12 | Extend | A data packet with an extended switch tag from CPU, the data packet contains another 32 bits of Tag |
| 11:0 | VID | The vid of the data packet |

In a data frame to be sent from a CPU, the Tag Command is set to a value of (1) (e.g., having a defined meaning of FROM_CPU). In one implementation, the data frame is forwarded from the CPU to a destination port without ingress or egress filtering. The Dst_Tagged bit indicates whether the data frame is to be transmitted from the destination port VLAN tagged or untagged.

The use_vidx bit indicates whether a data frame sent from the CPU is a unicast packet or a multicast packet. If the data frame is a unicast packet (use_vidx=0) the following bits—i.e., Trg Dev and Trg Port—in switch tag 406 contain the destination device and destination port. If the data frame is a multicast packet (use_vidx=1) the use_vidx field (together with the VID specified in switch tag 406) indicates a group to which the multicast packet is to be forwarded. In one implementation, the vidx field represents a direct pointer to a VLAN table and a multicast group table. The "Prio" field represents the transmit priority queue that the data packet is to be forwarded through.

Data Frame to Target Sniffer (Monitor)

Figure 9:
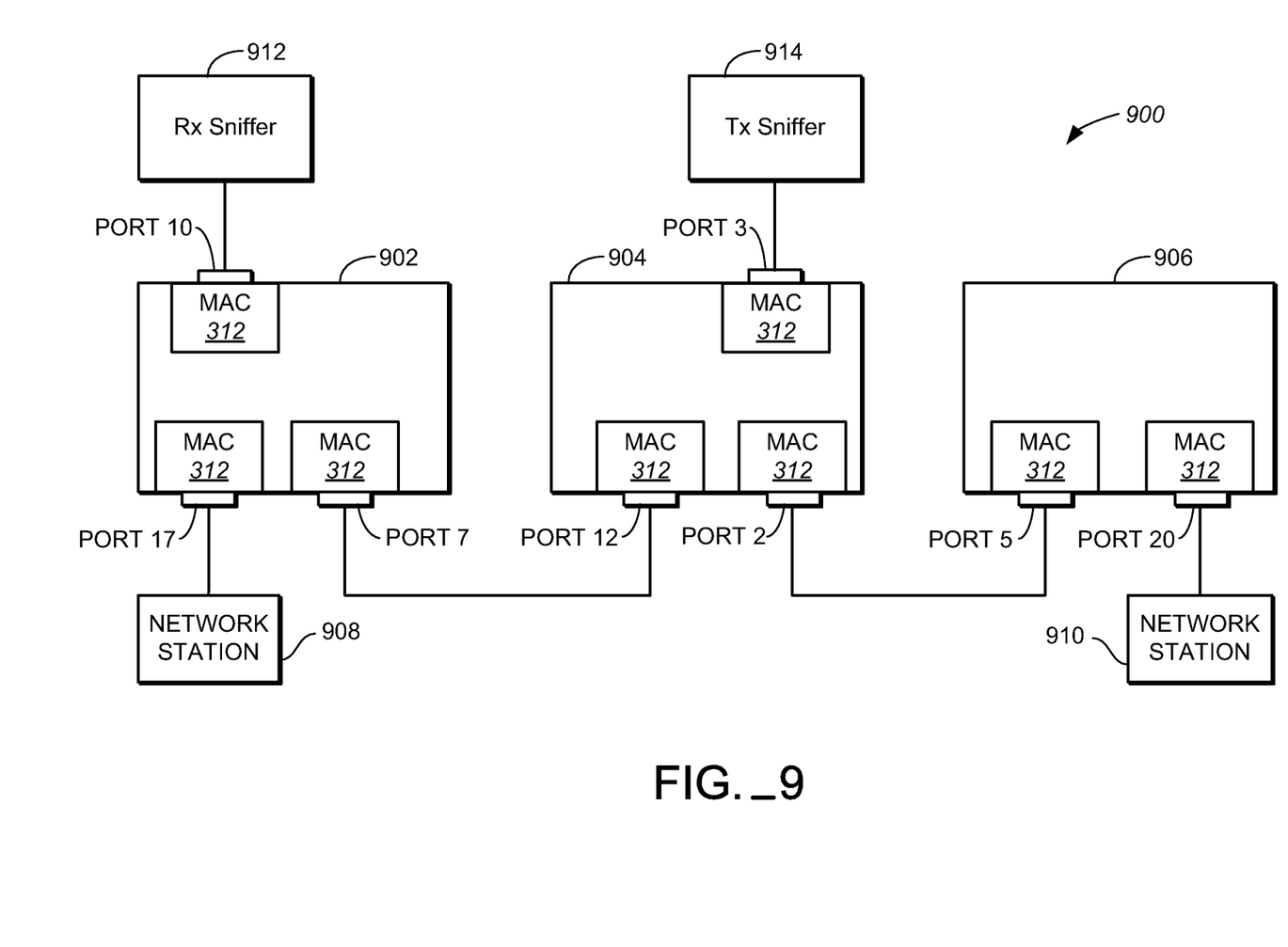
FIG. 9 is block diagram of a packet switched network.

FIG. 9 shows example of a packet switched network 900. Packet switched network 900 includes network switches 902-906, network stations 908-910, received packet sniffer 912, and a transmitted packet (Tx) sniffer 914. Port 10 of network switch 902 is connected to received packet (Rx) sniffer 912 and port 17 of network switch 902 is connected to network station 908. Port 7 of network switch 902 is connected to port 12 of network switch 904, and port 2 of network switch 904 is connected to port 5 of network switch 906. Port 3 of network switch 904 is connected to transmitted packet sniffer 914. Port 20 of network switch 906 is connected to network station 910.

In one implementation, in each network switch 902-906 there are two configuration registers that define a target transmitted packet (Tx) sniffer port (defined by port number and device number) and a target received packet (Rx) sniffer port (defined by port number and device number). Thus, according the example of FIG. 9, in each of network devices 902-906 the target Tx sniffer port is defined as (network switch 904, port 3) and the target Rx sniffer port is defined as (network switch 902, port 10).

When sniffing (or monitoring) data packets received at port 17 of network switch 902, the received data packets are mirrored to port 10 of network switch 902. When sniffing data packets transmitted from port 17 of network switch 902, the transmitted data packets are mirrored to port 3 of network switch 904. In one implementation, network switch 902 contains a target device-to-cascading port mapping that identifies port 7 (of network switch 902) as the port to which the transmitted data packets are to be forwarded. Network switch 904 receives the transmitted data packets at port 12 and forwards the data packets to port 3 (of network switch 904) to which transmitted packet sniffer 914 is connected.

Referring to FIGS. 4 and 9, switch tag 406 can contain one or more bits used to indicate a data packet that is to be sent to a target sniffer. In one implementation, switch tag 406 of a data packet to be sent to a target sniffer is encoded as shown in Table 3 below.

TABLE 3

| Bits | Name | Description |
|---|---|---|
| 31:30 | Tag_Command | 2—TO_TARGET_SNIFFER—data packet to Target sniff port—no egress filtering |
| 29 | Src_Tagged | 0—data packet was received from a network port untagged<br>1—data packet was received from a network port tagged |
| 28:24 | Src Dev | The Source Device (network switch) from which the data packet was received |
| 23:19 | Src_Port | The Source Port from which the data packet was received |
| 18 | rx_sniff | 0—data packet was Tx sniffed and is to be forwarded to Target Tx sniffer<br>1—data packet was Rx sniffed and is to be forwarded to Target Rx sniffer |
| 17:16 | Reserved | Set to zero |
| 15:13 | UP | 802.1p User Priority field |
| 12 | Extend | A data packet with an extended switch tag from CPU, the data packet contains another 32 bits of Tag |
| 11:0 | VID | The vid of the data packet |

In a data frame to be sent from a target sniffer, the Tag Command is set to a value of (2) (e.g., having a defined meaning of TO_TARGET_SNIFFER).

Forward Data Frame

Data packets that are destined to ports in different network switches are forwarded through cascading ports using switch tag 406. Referring to FIG. 4, switch tag 406 can contain one or more bits used to indicate a data packet that is to be forwarded through cascading ports. In one implementation, switch tag 406 of a data packet to be forwarded through cascading ports is encoded as shown in Table 4 below.

TABLE 4

| Bits | Name | Description |
|---|---|---|
| 31:30 | Tag_Command | 3—FORWARD—regular packet, bridging and egress filtering |
| 28:24 | Src Dev | The Source Device (network switch) from which the data packet was received |
| 23:19 | Src_Port | The Source Port from which the data packet was received when Tag Command == FORWARD and Src_Is_Trunk = 1 |
| 23:19 | Src_Trunk[4:0] | If the data packet was received on a Trunk Port, this field contains the source trunk number |
| Bits 23:19 | | when Tag Command == FORWARD and Src_Is_Trunk = 0 |
| Bits 23:19 | Src_Port | The Source Port from which the data packet was received when port is not a trunk member |
| 18 | Src_Is_Trunk | 0—if data packet was received from a network port that is not part of a trunk<br>1—if data packet was received from a network port that is part of a trunk |
| 17:16 | Reserved | Set to zero |
| 15:13 | UP | 802.1p User Priority field |
| 12 | Extend | A data packet with an extended switch tag from CPU, the data packet contains another 32 bits of Tag |
| 11:0 | VID | The vid of the data packet |

In a data frame to be forwarded through cascading ports, the Tag Command is set to a value of (3) (e.g., having a defined meaning of FORWARD).

Extended Data Frame

Figure 10:
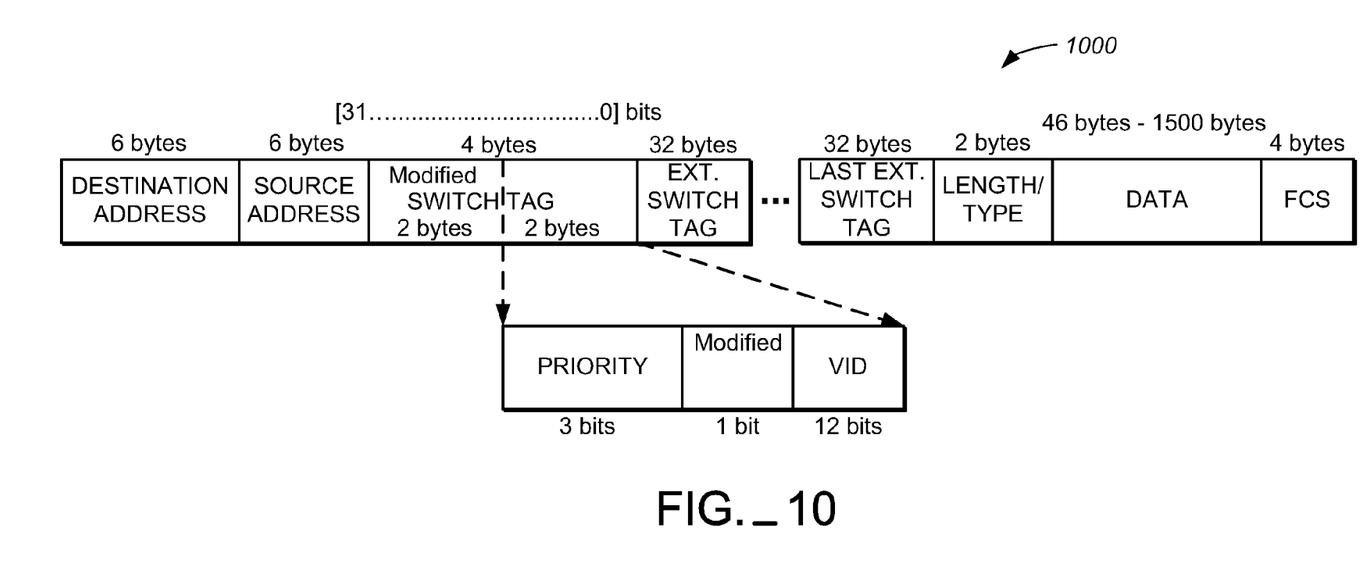
FIG. 10 schematic diagram of an extended data frame format.

Switch tags can be extended—i.e., switch tag 406 (FIG. 4) can be extended beyond 32 bits. In one implementation, the switch tag is extended by setting an extension bit in switch tag 406 to a value of (1). In one implementation, an extended portion (of switch tag 406) can have an extension bit, so that the extended portion can be extended and additional amount (e.g., by another 4 bytes). FIG. 10 illustrates an extended switch tag 1000.

Other Frame Types and/or Functions

In one implementation, information contained within the switch tag can be used to apply an Access Control Rule (ACL) upon egress of a data packet. For example, a common ACL is to "drop" or "forward" a data packet. Conventionally, an ACL can be applied to a data packet on an ingress process module (e.g., ingress control logic circuitry 500) when a data packet reaches an edge packet processor, during processing of a data packet by a central packet processor, and on an egress process through another edge packet processor, which requires use of 3 ACL modules. Unlike a conventional packet switched network, information embedded within switch tag 406 (FIG. 4) can also be used to run an ACL at an edge packet processor, thus, eliminating a need for a third ACL module. In one implementation, ACL lookup through an egress process (e.g., egress control logic circuitry 504) occurs in similar manner as an ingress process.

One or more of method steps described above can be performed by one or more programmable processors executing a computer program to perform functions by operating on input data and generating output. One or more method steps can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of implementations have been described. Nevertheless, it will be understood that various modifications may be made without departing from the spirit and scope of the invention. For example, locations of the various fields described above can be placed in a different order, and can be assigned a different number of bits. In addition, any type of information can be embedded within a given switch tag, for example, dynamic buffer congestion information can be sent through a plurality of network switches for data packet flow control and management-related tasks. Furthermore, FIG. 3 shows an implementation of network switches 302-306 that are internally stacked, however, a switch tag (e.g., switch tag 406) can be used within data packets flowing between network devices that are externally stacked. Accordingly, other implementations are within the scope of the following claims.

What is claimed is:

1. A method comprising:
   receiving a data packet;
   determining a data format of the data packet including determining whether the data packet has a tagged frame format associated with identifying a virtual local area network (VLAN) or VLAN group;
   generating switching information associated with data packet management based on the data format of the data packet; and
   modifying the data packet using the generated switching information including extending the modified data packet by a predetermined length to accommodate additional switching information,
   wherein when it is determined that the data packet has a tagged frame format, the method further comprising:
      identifying a VLAN tag protocol identifier (TPID) field and a Canonical Format Indicator (CFI) field within the tagged frame format; and
      modifying the VLAN TPID field and CFI field without modifying a priority field to produce a tag having a first portion encoded with the switching information and a second portion encoded with the additional switching information.

2. The method of claim 1, wherein:
   generating the switching information includes generating a tag portion embedded with the generated switching information; and
   extending the modified data packet includes:
      generating an extended tag portion corresponding to the predetermined length, and
      inserting the generated extended tag portion along with the generated tag portion into the modified data packet.

3. The method of claim 2, wherein:
   generating the tag portion includes providing an extension bit in the tag portion; and
   inserting the generated extended tag portion includes:
      setting the extension bit, and
      inserting the extended tag portion into the modified data packet in response to the set extension bit.

4. The method of claim 2, wherein:
   generating the extended tag portion includes providing an extension bit in the extended tag portion; and
   inserting the generated extended tag portion includes:
      setting the extension bit to extend the generated extended tag portion by an additional extended tag portion; and
      inserting the generated extended tag portion including the additional extended tag portion into the modified data packet.

5. The method of claim 1, wherein:
   determining the data format includes determining the data packet as an untagged frame format; and
   modifying the data packet includes modifying the untagged frame format to include a switch tag embedded with the generated switching information and an extended switch tag corresponding to the predetermined length, the extended switch tag embedded with the additional switching information.

6. The method of claim 1, further comprising managing the extended modified data packet through a network switch using the switching information and the additional switching information embedded in the extended modified data packet.

7. The method of claim 1, wherein modifying the data packet includes modifying the VLAN TPID field and the CFI field without changing an overall length of the data packet.

8. A device comprising:
   an input port to receive a data packet;
   first logic circuitry configured to determine whether a data format of the data packet is a tagged frame format associated with identifying a virtual local area network (VLAN) or VLAN group; and
   second logic circuitry configured to:
      generate switching information associated with data packet management based on the data format of the data packet,
      modify the data packet using the generated switching information, and
      extend the modified data packet by a predetermined length to accommodate additional switching information,
   wherein when the first logic circuitry determines that the data format of the data packet is a tagged frame format, the second logic circuitry is further configured to:
      identify a VLAN tag protocol identifier (TPID) field and a Canonical Format Indicator (CFI) field within the tagged frame format, and
      modify the VLAN TPID field and the CFI field without modifying a priority field to produce a tag having a first portion encoded with the switching information and a second portion encoded with the additional switching information.

9. The device of claim 8, wherein the second logic circuitry is configured to:
generate a tag portion embedded with both the generated switching information and an extended tag portion corresponding to the predetermined length; and
modify the data packet by inserting the generated tag portion and the generated extended tag portion into the data packet.

10. The device of claim 9, wherein:
the tag portion includes an extension bit; and
the second logic circuitry is configured to insert the extended portion into the data packet after the extension bit is set.

11. The device of claim 8, wherein:
the first logic circuitry is configured to determine the data format as an untagged frame format; and
the second logic circuitry is configured to modify the untagged frame format to include a switch tag embedded with the generated switching information and an extended switch tag corresponding to the predetermined length and embedded with the additional switching information.

12. The device of claim 11, wherein the second logic circuitry is configured to insert the extended switch tag between a source address field indicative of a source from which the data packet is received and a length field indicative of a length of the received data packet.

13. The device of claim 8, wherein the tag is produced without increasing a length of the modified data packet before the modified data packet is extended.

14. The device of claim 8, wherein the second logic circuitry is configured to remove the tag and restore the VLAN TPID field and the CFI field if the data packet is to be sent through a VLAN port.

15. The device of claim 8, further comprising a queue controller configured to replicate the extended modified data packet that is to be forwarded to a plurality of network switches.

* * * * *